United States Patent [19]

Opperud et al.

[11] 4,419,909

[45] Dec. 13, 1983

[54] METHOD OF CONTROLLING A POWER TRANSMISSION DEVICE AND CONTROL SYSTEM FOR CARRYING OUT SAID METHOD

[75] Inventors: Hans-Jörgen Opperud; Sven Å. L. Carlsson; Hans G. Ericson, all of Eskilstuna, Sweden

[73] Assignee: Volvo BM AB, Eskilstuna, Sweden

[21] Appl. No.: 162,675

[22] Filed: Jun. 24, 1980

[30] Foreign Application Priority Data

Jun. 28, 1979 [SE] Sweden .............................. 7905695

[51] Int. Cl.$^3$ .............................................. B60K 41/06
[52] U.S. Cl. ....................................... 74/856; 74/866; 74/878
[58] Field of Search ................. 74/843, 856, 861, 863, 74/864, 866, 878

[56] References Cited

U.S. PATENT DOCUMENTS

| | | | |
|---|---|---|---|
| 2,961,889 | 11/1960 | Granryd | 74/861 |
| 4,223,573 | 9/1980 | Franssen | 74/866 X |
| 4,301,689 | 11/1981 | Peppel | 74/866 X |

Primary Examiner—Rodney H. Bonck
Attorney, Agent, or Firm—Young & Thompson

[57] ABSTRACT

A method of controlling a power transmission device between a driving engine and a drive axle comprising a torque converter and an automatic step gearbox, and a power transmission device for carrying out the method. In the gearbox, an electric control device with a microcomputer permits the operator to select, by means of a direction selector, the desired driving direction of the vehicle even when moving opposite to the desired direction. When such a directional command signal is sent to the control device, the reversing gear control reverses the working direction of the gearbox to make it work in the opposite direction to the driving direction. This signal is also sent to the drive gear control in the control device which during retardation maintains the engaged gear in engagement. If the highest gear is engaged when the command signal is changed, however, downshifting to the next higher gear immediately takes place which gear is then maintained during retardation. The reversing gear control is prevented from reversing the working direction of the gearbox if the vehicle speed exceeds a predetermined maximum value. The beginning of the retardation is then carried out with the working direction of the gearbox unchanged until the speed has dropped below that maximum, and then the working direction is reversed.

5 Claims, 3 Drawing Figures

METHOD OF CONTROLLING A POWER TRANSMISSION DEVICE AND CONTROL SYSTEM FOR CARRYING OUT SAID METHOD

The present invention relates to a method of and system for controlling a power transmission device. The invention is primarily directed to work vehicles such as wheeled loaders, in which the driving direction is reversed at short intervals during operation. The vehicle operator has a number of tasks to perform at the same time: steering the vehicle, shifting the vehicle gearbox, and operating the implement, e.g. lifting and tipping a bucket. The purpose of the invention is primarily to make these tasks easier for the operator of such a vehicle by automatically controlling the operation of the gearbox.

According to the invention, this is achieved by a method and system as hereinafter characterized. In contrast to what is usual in, for example, automatic transmissions in cars, it is possible for the operator, with the aid of the method and system according to the invention, to preselect a different driving direction of the vehicle, whereafter the reversing process is carried out automatically. According to the invention, the operating direction of the gearbox is reversed even before the vehicle has stopped, whereby the retardation can be made stronger by greater power absorption in the torque converter. The retardation, or braking effect, can be varied and is increased by pressing down the accelerator.

The reversing gear arrangement can either comprise a separate reversing gear, with the gearbox comprising a number of drive gears which can be used independently of the driving direction, or separate sets of driving gears for forward and reverse. In the latter case the gear ratios for reverse driving can be selected independently of the gears for driving forward.

If the speed of the vehicle or the rotation speed of the drive axle exceeds a predetermined limiting speed, when the directional command signal is changed, according to a preferred further embodiment of the invention, the reversal of the working direction of the gearbox is delayed until the speed is less than said limiting speed. This prevents excessive generation of heat in the torque converter.

The gear which is engaged when the retardation process is begun, is maintained according to a further development of the invention during the entire retardation, thus producing a soft retardation. If, however, the highest gear, especially in a gearbox with at least four driving gears, is engaged when the retardation process is initiated, according to the invention there immediately takes place a shifting down to the next higher gear. In a four-speed gearbox, for example, if fourth gear is engaged and the speed is 30 km/h when the command is given for reversal, there takes place an immediate downshifting to third and deceleration in this gear until the speed is less than the limiting speed, i.e. 25 km/h, whereafter the working direction of the gearbox is reversed. The reason for not leaving the highest gear in engagement is that it has been determined that while it is true that the engagement of the lower gear produces a more powerful retardation, it is at the same time shorter, resulting in generation of less heat in the torque converter.

Once the operator has selected the desired driving direction, he need not do anything more in the reversing process. When the retardation has been completed and the speed is 0, the vehicle starts in the new direction via automatic control of the gearbox. For a loader, second gear is selected here. The lowest gear, first, is normally only used for bucket filling.

Even during a normal start, but not during a reversing sequence, second gear is usually selected as a starting gear. Under certain conditions, namely if the engine r.p.m. exceeds a certain predetermined value, or the speed of the vehicle or of the drive axle exceeds a certain predetermined lower speed value, the vehicle is started in the next higher gear, third, thus avoiding powerful acceleration or retardation jerks.

It is preferable not to have automatic downshifting to the lowest gear, first gear. Rather, it should be controlled directly by a forced downshift signal actuated manually by the operator. First gear is used primarily for bucket filling, and the filling work can be done more quickly with operator-actuated downshifting than if the gearbox must wait for an automatically controlled forced downshift signal. In this case it is suitable to block actuation of the forced downshift signal when the vehicle speed is greater than a certain maximum speed, since downshifting to first gear would then cause a powerful retardation. This maximum speed can suitably be selected so as to permit downshifting only within the range of second gear.

A practical arrangement for a vehicle such as a wheeled loader is to arrange the direction selector control and the forced downshift signal as a multifunction control next to the steering wheel, so that the operator can operate the steering wheel, direction selector and forced downshift signal actuation with one hand. The operator then has the other hand free to operate the bucket and to help with the controls to speed up the reversing if necessary.

The invention will now be described in more detail with the aid of examples in the form of a power transmission device for a wheeled loader.

Figure 1:
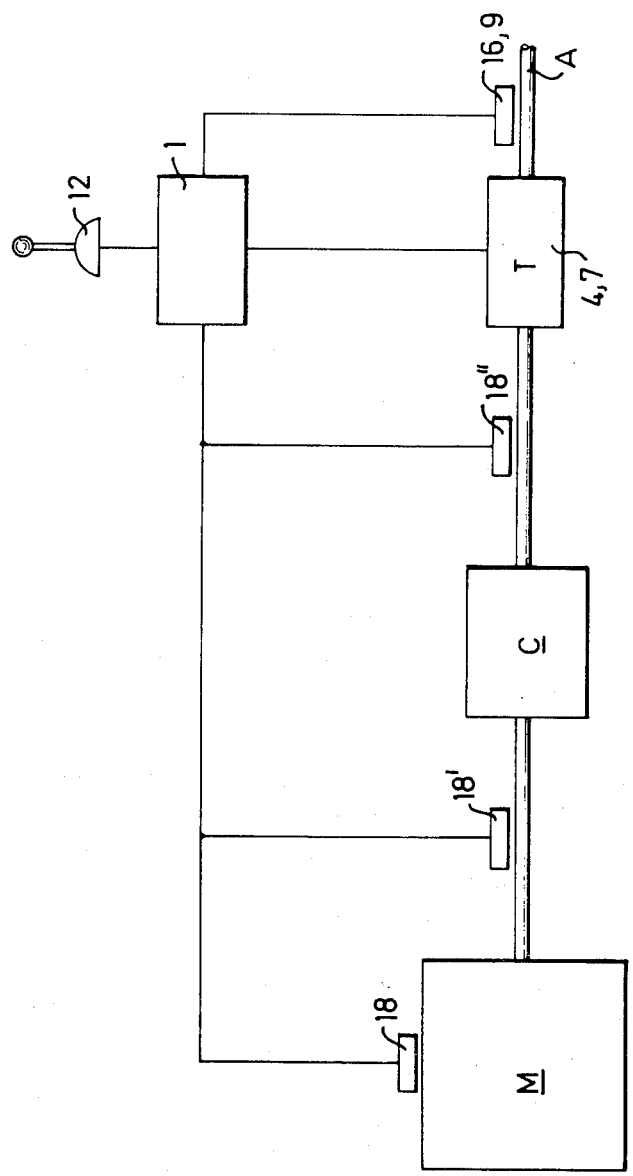
FIG. 1 shows the power transmission device in block diagram form.

FIG. 1 shows a driving engine M which drives a hydrodynamic torque converter C, which in turn drives a mechanical gearbox T which has four driving gears and one reversing gear, with the aid of which the drive gears can be used to drive the output axle A, and thus the vehicle, either forwards or backwards. The shifting in the gearbox is controlled electrically by means of an electrical control device 1. A driving direction control is connected to the control device 1.

Figure 2:
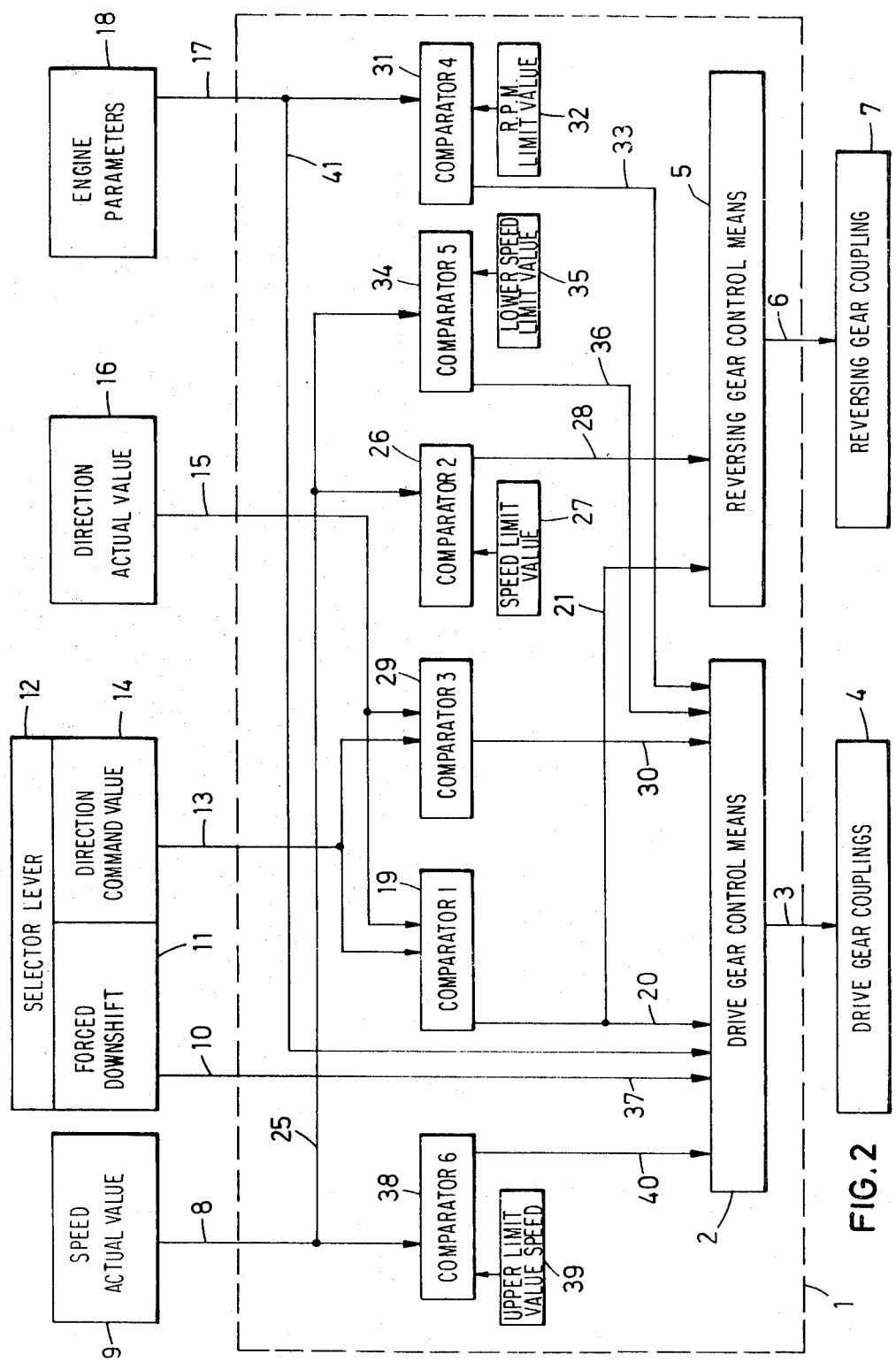
FIG. 2 shows in block diagram form a control device for the gearbox of the power transmission device.

FIG. 2 indicates with a dashed rectangle the electrical control device 1 for controlling the gearbox T of the loader. For this purpose, the control device has drive gear control means 2 which are connected, via a first output 3, with solenoids or the like for operating couplings or brakes 4 associated with the gearbox driving gears. The control device 1 also comprises reversing gear control means 5 which are connected, via a second output 6, to solenoids or the like for operating the couplings and brakes 7 associated with the gearbox reversing gear.

A first input 8 of the control device 1 is connected to a sensor 9 for the speed of the loader. The sensor 9 can, for example, sense the r.p.m. of the output axle A (FIG.

1). A second input 10 of the control device is connected to a forced downshaft signal sender 11, suitably made as a part of a multifunction control, for example in the form of a selector lever 12 located next to the steering wheel. A third input 13 is connected to an indicator 14 for the desired driving direction. This indicator 14 is also suitably included in the multifunction control constructed as a directional selector lever 12. A fourth input 15 is connected to a sensor 16 for the driving direction of the vehicle. Also sensor 16 can sense the output axle A and can possibly be combined with sensor 9. A fifth input 17 in the control device 1 is connected to a number of sensors 18 for various engine parameters such as engine r.p.m. and load.

The control device 1 contains a first comparator 19, in which the directional command value from the indicator 14 is compared with the directional actual value from the sensor 16. When the command signal at input 13 is changed to the opposite direction to the actual value signal at input 15, the first comparator 19 sends a reverse signal on a line 20 to the driving gear control means 2. A line 21 branches off from the line 20 and leads to the reversing gear means 5.

The actual speed value from the sensor 9 at input 8 is fed over line 25 to a second comparator 26, which also has an input connected to a first memory 27 in which a predetermined blocking or limiting speed is stored, for example 25 km/h. The second comparator 26 is adapted to that when the speed value in the line 25 is less than the blocking speed value, it sends a reverse go-ahead signal via a wire 28 to the reversing gear control means 2.

When the driving gear control means 2 receive the reverse signal on the line 20, they actuate the downshifting to third gear from fourth gear, if it is engaged. Otherwise, no gear shifting is actuated, i.e. the engaged gear is maintained.

When the reversing gear control means 5 receive the reverse signal on line 21, the means send a signal, via the outlet 6, to the reversing gear coupling 7 for shifting the reversing gear, provided that there is a go-ahead signal in line 28. If this is not the case then no reversal of direction takes place. For this purpose, the reversing gear control means 5 are provided with logic circuits.

The directional command value signal at input 13 and the directional actual value signal at input 15 are also compared in a third comparator 29. When the directional value is 0 and the directional command value is non-zero, it sends a start signal via line 30 to the driving gear control means 2.

An engine r.p.m. signal stemming from the sensors 18 at input 17 is sent to a fourth comparator 31, which also has an input connected to a second memory 32 for a predetermined r.p.m. limit value, e.g. 1000 r.p.m. The comparator compares the engine r.p.m. with the r.p.m. limit value, and when the engine r.p.m. exceeds this limit value the comparator 31 sends a soft-start signal via line 33 to the driving gear control means 2.

The speed actual value signal at input 8 is also sent to a fifth comparator 34, which has a second input connected to a third memory 35 for a lower speed limit value, e.g. 2 km/h. The comparator 34 compares the actual speed of the vehicle with the limit value stored in the memory 35 and when the actual speed exceeds this limit value the comparator 34 sends a soft-start signal via a line 36 to the driving gear control means 2.

The driving gear control means 2 are disposed so that when there is a start signal in the line 30, a shift signal is sent on output 3 to the drive gear couplings 4 for engaging second gear. This is always the case with a start signal in direct connection with a reverse signal. If, however, a soft-start signal occurs in line 33 or 36 simultaneously with the start signal in line 30 and without an immediately preceding reverse signal in line 20, the drive gear control means 2 will instead send a shift signal for engaging third gear. For this purpose the drive gear control means 2 are provided with logic circuits.

The forced downshift signal at input 10 is sent via a line 37 to the drive gear control means 2. The actual speed value signal is sent from input 8 of the control device 1 to a first input of a sixth comparator 38, while the second input of the comparator 38 is connected to a fourth memory 39 for an upper limiting speed, which is suitably selected to be the same as the upper limit of the range of second gear. The comparator 38 compares the vehicle speed with the upper speed in the memory 39, and when the vehicle speed is less than the upper limiting speed, the comparator 38 sends a go-ahead signal on line 40 to the drive gear control means 2. When they receive both the forced downshift signal on line 37 and the go-ahead signal on line 40, they send a downshift signal on output 3 to the drive gear couplings 4 for downshifting to first gear. If there is no go-ahead signal in line 40, then no downshift signal is sent.

Input 17, connected to the sensors 18 for engine parameters, is connected via a line 41 to the drive gear control means 2, whereby they receive engine parameter signals for controlling the automatic up-and down-shifting of the gearbox dependent on the load while driving. It is desirable that the shift point between the various driving gears be selected so that the accelerations are smooth when shifting. For this purpose, the shift point between two gears should be placed where the torque curves for the two gears in question intersect. The torque can preferably be measured directly by comparison between the input and output r.p.m. of the torque converter C (see sensors 18' and 18" in FIG. 1).

Thus when driving the vehicle in a certain direction, the drive gear control means controls the shifting in the gearbox depending on the engine parameter signals in line 41. If the driver desires to change the driving direction he flips over the selector lever 12, whereby the sensor 14 sends a directional command value signal to input 13, which is opposite to the actual directional value signal to input 15.

The first comparator 19 now sends a reversing signal both to the drive gear control means 2 via line 20 and to the reversing gear control means 5 via line 21. The drive gear control means 2 takes care of the downshifting to third gear from fourth gear if fourth is engaged. The reversing gear control means 5 takes care of the changing of the reversing gear provided a go-ahead signal is received from the second comparator 26, i.e. that the vehicle speed is less than 25 km/h. If this is not the case, there is first a retardation in third gear without change-over of the reversing gear until the speed is reduced to below 25 km/h, whereafter there is a go-ahead signal in line 28 and the reversing gear control means 5 effects the reversal of the gearbox rotational direction.

Downshifting from fourth to third gear prevents prolonged retardation in fourth gear, which could result in overheating in the torque converter. Shifting of the reversing gear only below 25 km/h prevents excessive heat generation in the torque converter.

During the retardation process the reversing signal is maintained in the line 20, whereby the drive gear control means 2 maintains the driving gear engagement unchanged. Thus if third gear or second gear were engaged when the operator gave the reverse command, third or second gear, respectively, would remain engaged during the continued retardation.

When the speed has dropped to 0, this is sensed by the third comparator 29 by the directional actual value signal also being 0. The comparator 29 sends a start signal on the line 30 to the drive control means 2 which couples in the second gear for the start sequence in the new driving direction.

In an ordinary start without the reversing sequence, the drive gear control means 2 also receives a start signal on the line 30 for engaging second gear. If, however, the engine r.p.m. exceeds 1000 r.p.m. or the speed of the vehicle exceeds 2 km/h, the drive gear control means 2 also receives a soft-start signal on line 33 or 36, respectively, whereby the start is effected in third gear and not in second gear.

If the operator wishes to engage first gear, for example to obtain increased force to fill the bucket, he actuates with the selector lever 12 the forced downshift signal sender 11, whereby a forced downshift signal is sent via the line 37 to the drive gear control means 2. Provided that there is a go-ahead signal in the line 40, i.e. that the vehicle speed is within the working range of second gear, the drive gear control means 2 effects the downshifting to first gear. If the speed is too great, it must first be reduced to below the upper limiting speed before downshifting to first gear is effected. After downshifting to first gear has been effected in this manner, a time circuit (not shown here), in the drive gear control means 2 for example, sees to it that automatic shifting up to second cannot take place within a certain predetermined time, e.g. five seconds.

Figure 3:
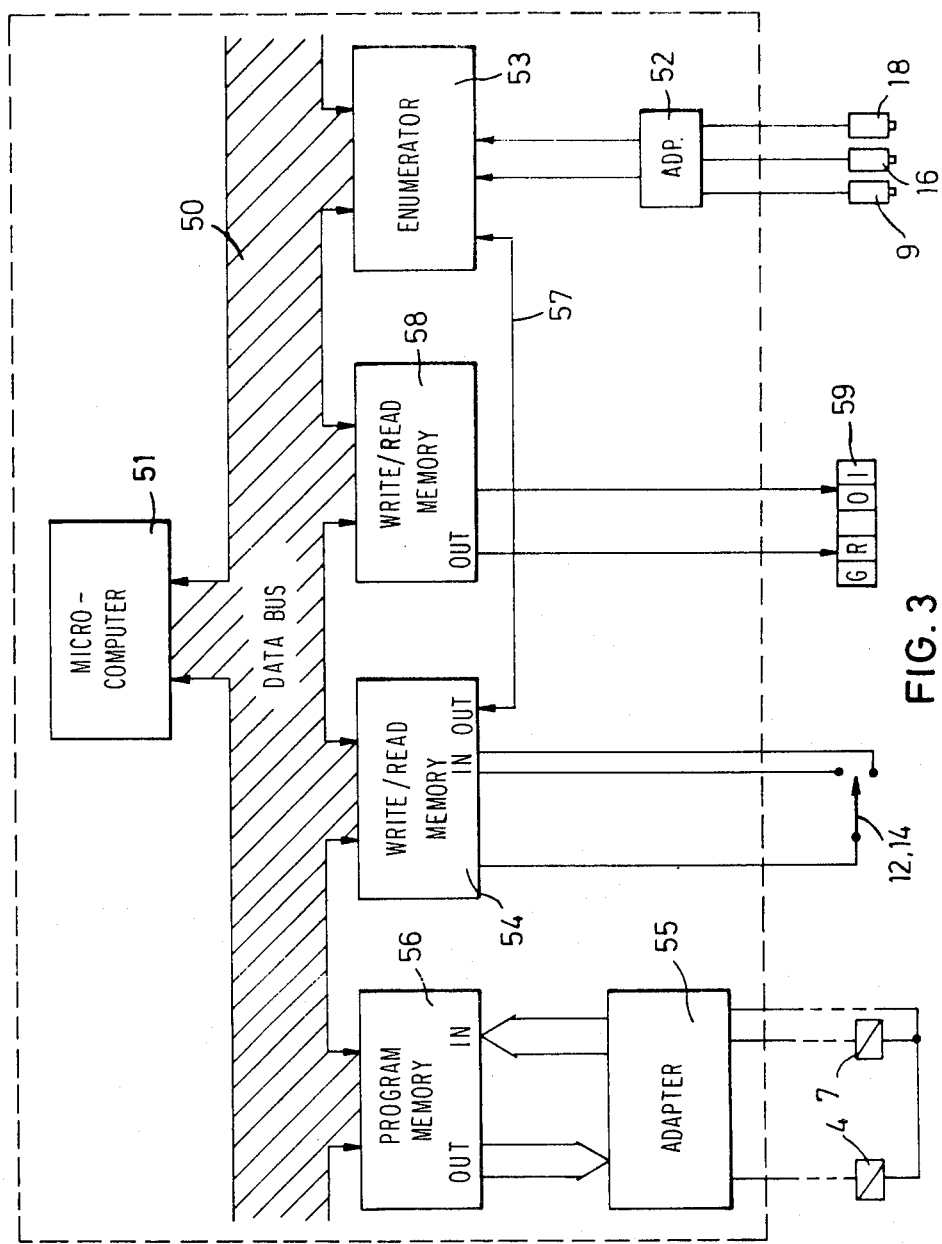
FIG. 3 shows in block diagram form a control device equipped with a microcomputer.

Many functions in the control device indicated within the dashed line in FIG. 2 can be performed by a microcomputer. FIG. 3 shows in simplified block diagram form a control device constructed in this manner. It contains a data bus 50, to which a microprocessor 51 is connected, e.g. an Intel 8085. The sensors 9, 16 and 18 for the actual speed, the actual direction and the engine parameters are joined via adapters 52 to an enumerator 53 connected to the data bus 50. The direction selector 12, 14 is joined to a read/write memory 54 connected to the data bus. The forced downshift signal sender 11 can be connected in a corresponding manner (not shown). The electrically operated driving and reversing gear couplings and brakes 4,7 are joined via an adapter 55 to a program memory 56, connected to the bus 50 and corresponding to the drive gear control means 2 and the reversing gear control means 5 in FIG. 1. An output signal from the memory 54 is sent via a line 57 to an input in the enumerator 53.

An additional write/read memory 58 is joined to an indicator device 59, which shows the operator desired data, e.g. which gear is engaged at that time.

What we claim is:

1. In a method of controlling a power transmission device arranged between a driving engine and a drive axle and comprising a torque converter and a mechanical step gearbox, especially for vehicles such as wheeled loaders, comprising controlling the gearbox both automatically in response to engine parameters such as rotational speed and torque, and in response to a directional signal from a manually actuated direction selector control, emitting a command value for the rotational direction of the drive axle, delaying the reversal of the working direction of the gearbox until the speed is less than a predetermined limiting speed value if the speed of the vehicle or the rotational speed of the drive axle exceeds said value, and reversing the direction of the gearbox when the directional command value signal is changed to indicate the opposite rotational direction to the prevailing rotational direction of the drive axle so that during the subsequent retardation it works against the prevailing drive axle direction; the improvement comprising maintaining during the entire retardation that gear in engagement which is in engagement at the beginning of the retardation, downshifting immediately to the next-to-the-highest gear if the highest gear is engaged when the directional command signal is changed, and when the retardation has been completed and the speed of the axle and vehicle is zero, engaging the next-to-the-lowest gear of the gearbox for the subsequent acceleration.

2. Control system for controlling a power transmission device, especially for vehicles such as wheeled loaders, comprising a torque converter and a mechanical step gearbox arranged between a drive engine and an output drive axle, said gearbox having on the one hand at least two drive gears intended for altering the torque transmitted to the drive axle, between which gears the shifting sequence is controlled automatically dependent on engine parameters such as load and rotational speed, and on the other hand a reversing gear device intended for changing the rotational direction of the drive axle, the reversing of said gear device being controlled under the influence of a directional selector control manually actuated by the operator, characterized in that the device comprises an electrical control device having drive gear control means and reversing gear control means, which are joined to gear couplings and/or gear brakes operable in a known manner by electric control and associated with the drive gears or the reversing gear for controlling the rotational speed and the direction of the drive axle; that the control device is supplied with signals from sensors for engine parameters such as engine speed; that a sensor for the rotational direction of the drive axle is joined to the control device to supply it with a directional actual value signal; that the directional selector control is connected to the control device to supply it with a directional command value signal; and that the control device comprises a first comparator joined to the reversing gear control means and adapted to compare said actual and command value signals and, when the command value signal is changed to indicate the opposite direction to the actual value signal, to send a reverse signal to the reversing gear control means for changing over the reversing gear, whereby the working direction of the gearbox is reversed even before the rotational direction of the drive axle is changed.

3. System according to claim 2, characterized in that a sensor for the rotational speed of the drive axle or the speed of the vehicle is connected to a second comparator adapted to compare the actual speed value from the sensor with a predetermined speed limit value stored in a first memory and, when the actual value is less than the limit value, to send a reverse go-ahead signal to the reversing gear control means, and that said reversing gear control means are disposed to effect the change-over of the reversing gear only when there is both the reverse signal and the go-ahead signal.

4. System according to claim 2, characterized in that the drive gear control means are disposed, in the presence of the reverse signal, to control downshifting from the highest to the next higher gear, in a gearbox with at least four gears, but otherwise maintaining the driving gear engagement unchanged.

5. System according to claim 2 characterized in that a third comparator is adapated to compare the actual and command directional value signals and, when the actual value is zero and the command value is different from zero, to send a start signal to the drive gear control means; that at least one of (a) an engine rotational speed sensor is connected to a fourth comparator adapted to compare the actual rotational speed value obtained from the sensor with a predetermined rotational speed-limiting value stored in a second memory and that, when the actual value exceeds the limiting value, to send a soft-start signal to the drive gear control means and (b) a sensor for the rotational speed of the drive axle or the vehicle speed is connected to a fifth comparator adapted to compare the actual speed value from the sensor with a predetermined lower speed limit value stored in a third memory and, when the actual value exceeds the lower limiting value, to send a soft-start signal to the drive gear control means; and that the drive gear control means are disposed in the presence of the start signal to engage the second gear in connection with the reverse signal in the absence of a soft-start signal and engage the third gear in the presence of a soft-start signal.

* * * * *